United States Patent [19]

Shin

[11] Patent Number: 5,689,489

[45] Date of Patent: Nov. 18, 1997

[54] COMPACT DISC AND FLOPPY DISC COMPATIBLE DRIVE AND A DRIVING METHOD THEREOF

[75] Inventor: Hyun Ki Shin, Seoul, Rep. of Korea

[73] Assignee: LG Electronics Inc., Seoul, Rep. of Korea

[21] Appl. No.: 551,614

[22] Filed: Nov. 1, 1995

[30] Foreign Application Priority Data

Nov. 1, 1994 [KR] Rep. of Korea ............... 28518/1994

[51] Int. Cl.$^6$ ............................................. G11B 25/04
[52] U.S. Cl. .................... 369/75.2; 369/75.1; 369/15
[58] Field of Search ........................ 369/75.1, 75.2, 369/77.2, 14, 15, 292

[56] References Cited

U.S. PATENT DOCUMENTS 5,450,379  9/1995  Fujimori et al. ................. 369/14

FOREIGN PATENT DOCUMENTS

60-253059  12/1985  Japan ......................... 369/14
62-89261   4/1987   Japan ......................... 369/15
8403756    7/1986   Netherlands ................... 369/14

Primary Examiner—Robert S. Tupper
Assistant Examiner—William R. Korzuch

[57] ABSTRACT

A compact disc and floppy disc compatible driver and a driving method thereof, in which a structure is improved for simultaneously driving a floppy disc and a compact disc including commodities of applying a compact disc such as a CD, CD-ROM and video CD to minimize an installation area, thereby tightly compacting a notebook computer. The driver has a magnetic head reciprocally movable along a first guide rail, a stepping motor fixedly installed to one side of the magnetic head, a turntable of a double loading system with steps rotatably attached to the upper portion of a lower side, a detecting unit installed to both inner sides of the entrance side for receiving the inserted floppy disc or compact disc, a pickup storing an optical head therein coupled to second guide rails, a sled motor fixed by being connected to the optical head for driving the optical head in the radius direction of the compact disc, and a loading mechanism for up/down a tray by two steps.

2 Claims, 7 Drawing Sheets

COMPACT DISC AND FLOPPY DISC COMPATIBLE DRIVE AND A DRIVING METHOD THEREOF

BACKGROUND OF THE INVENTION

1. Field of the Invention

The present invention relates to a compact disc and floppy disc compatible driver and a driving method thereof, and more particularly to a compact disc and floppy disc compatible driver and a driving method thereof capable of performing functions of a driver for driving commodities of applying a compact disc such as a CD, CD-ROM or video CD (hereinafter simply designated as "CD" only) and of a driver for driving a floppy disc in a single place.

2. Description of the Prior Art

Conventional desktop computers are generally equipped with a CD driver as a basic option besides a hard disc driver (HDD) and a floppy disc driver (FDD) as auxiliary memory devices.

Figure 1:
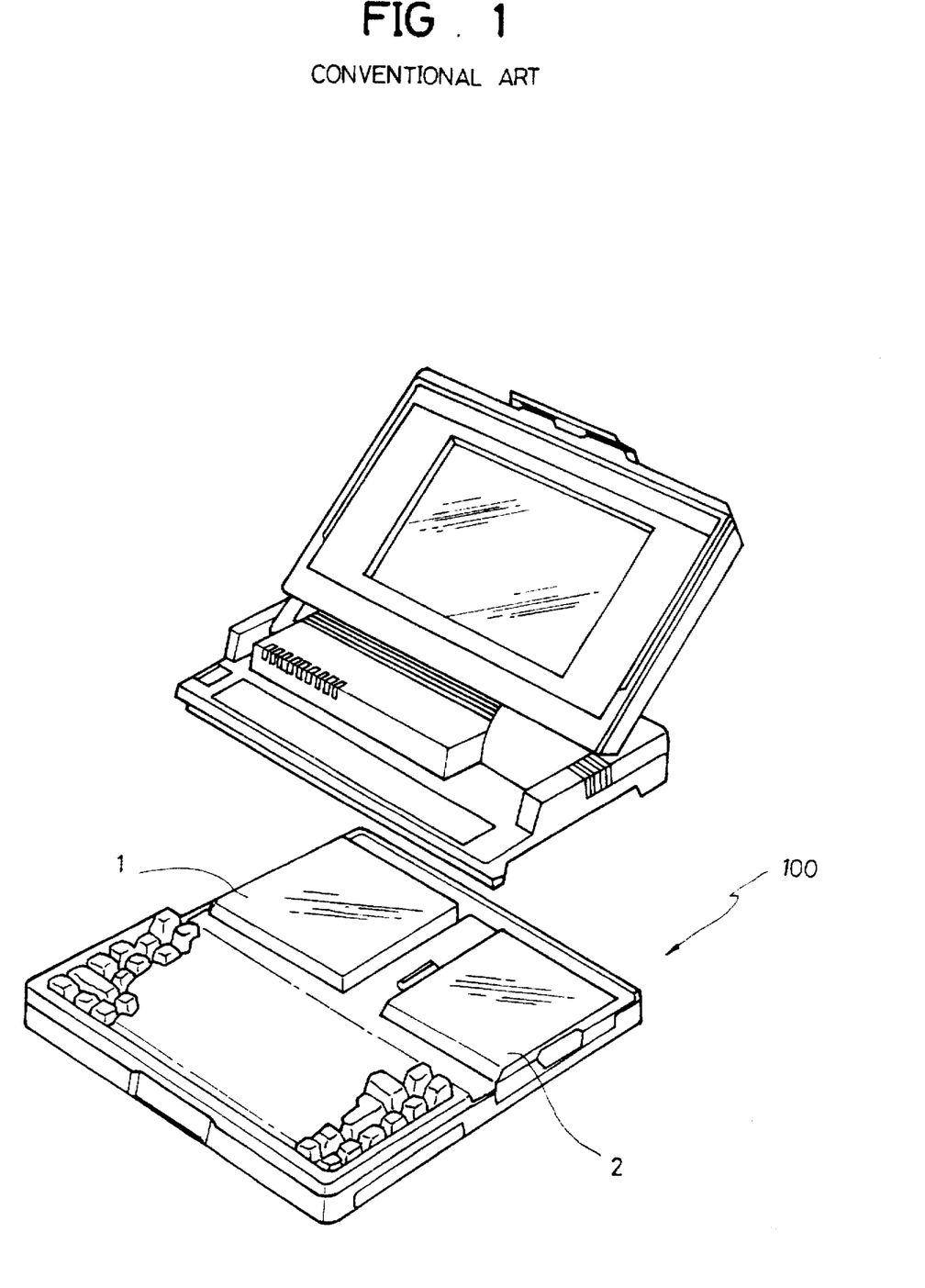
FIG. 1 is an exploded perspective view showing a notebook computer.

Meantime, since a conventional notebook computer as shown in FIG. 1 has a minimized main body, there is no room for a CD driver after installing the HDD and FDD. Thus, only the HDD 1 and the single FDD 2 (typically of 3.5 inch size) are installed within a computer main body 100 as the auxiliary memory device.

Accordingly, an endeavor striving for mounting a CD driver in addition to existing HDD 1 and FDD 2 had been conducted while leaving the size of main body 100 of the conventional notebook computer to suggest a method of using the FDD and CD driver in the same place, thereby reducing cost as well as decreasing an installation space.

Hereinbelow, a structure and driving principle of a conventional compact disc driver and FDD will be described.

Figure 2A:
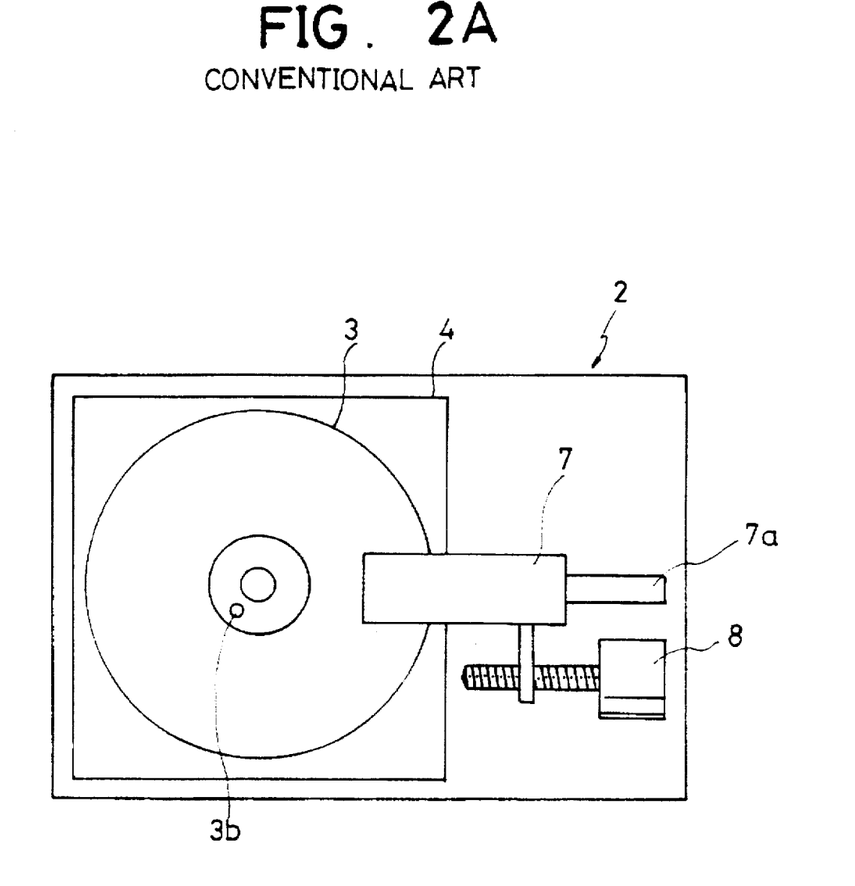
FIG. 2A is a plan view showing a conventional FDD.
Figure 2B:
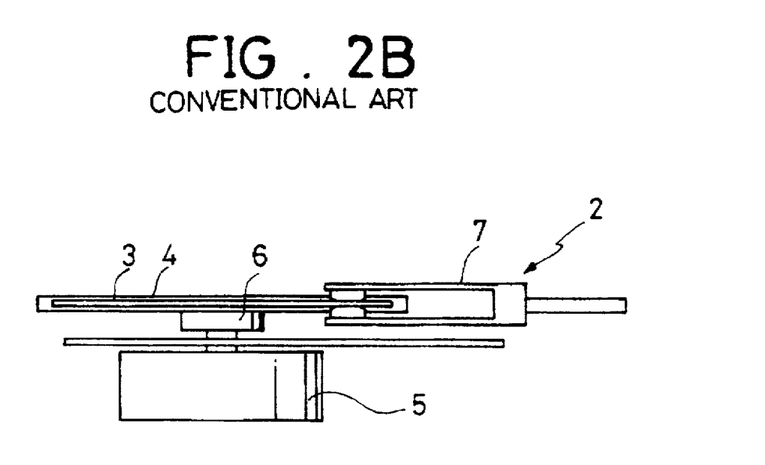
FIG. 2B is a front view showing the conventional FDD.

As illustrated in FIGS. 2A and 2B, a guide rail 7a is installed on the center of one inner side of the FDD 2, and a magnetic head 7 is fitted to guide rail 7a to perform a reciprocating motion. A stepping motor 8 for actuating magnetic head 7 along guide rail 7a is fixedly installed to one side of FDD 2 while being coupled to the magnetic head 7.

Under the lower plane of FDD 2, a turnable 6 is rotatably installed to the upper portion by a pin (not shown) which can be pressed upon a predetermined portion thereof. A spindle motor 5 connected to the lower plane of the turntable 6 is rotatably attached to the lower side of the lower plane of FDD 2.

A plurality of pressurizable check rods (not shown) for checking the state and volume of a floppy disc (hereinafter simply referred to as "FD") are installed to both inner sides toward the entrance within FDD 2.

Once a diskette 4 containing therewithin a FD 3 is inserted to the interior of FDD 2 constructed as above, the FD 3 is seated onto the turntable 6 and the spindle motor 5 is rotated to thus rotate the FD 3 when an insertion aperture formed in a steel plate of FD 3 coincides with a pin 3b to admit pin 3b therein.

At this time, spindle motor 5 for rotating the turntable 6 having FD 3 thereon is driven by a Constant Angular Velocity (CAV) system. Also, while magnetic head 7 contacting both sides of FD 3 is moved in accordance with the driving of stepping motor 8 in the radius direction of FD 3 which is rotated by spindle motor 5, the read and write operation from and on the FD 3 is executed.

Figure 3A:
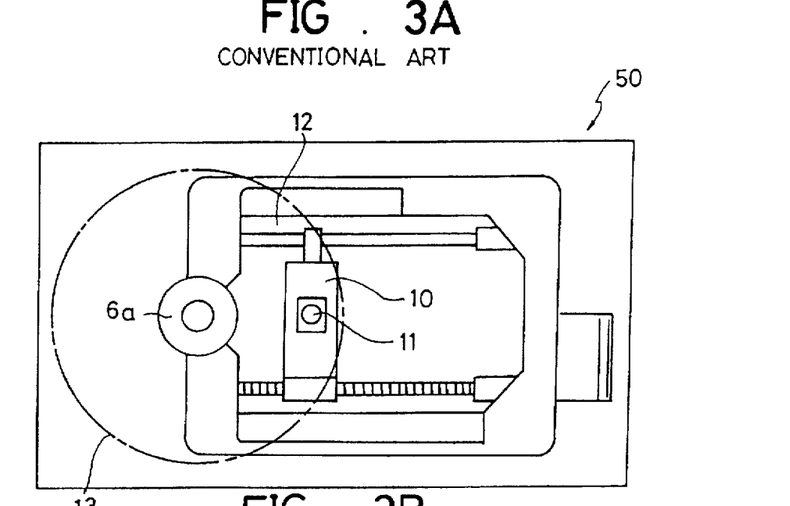
FIG. 3A is a plan view showing a conventional CD driver.
Figure 3B:
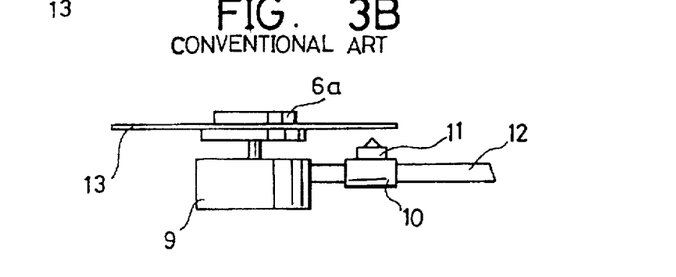
FIG. 3B is a front view showing the conventional CD driver.

On the other hand, in a conventional CD driver 50, as shown in FIGS. 3A and 3B, two guide rails 12 spaced apart from each other by a predetermined distance are lengthwisely installed in the inner center thereof. A pickup 10 storing an optical head 11 therein is transversely connected to the guide rails 12 for reading and writing data from and on a CD 13.

A sled motor (not shown) connected to the pickup 10 for driving the pickup 10 is fixed to one side of a CD driver 50 at one side of guide rails 12 and pickup 10. A spindle motor 9 connected below a turntable 6a is rotatably attached to the lower side of the lower plane of CD driver 50.

Once CD 13 is inserted to the interior of CD driver 50 constructed as above through a driver insertion groove (not shown), the CD 13 is centered to the turntable 6a disposed over the spindle motor 9 to be seated thereon.

Successively, CD 13 is rotated to simultaneously move pickup 10 storing optical head 11 therein in the radius direction of CD 13 by means of the sled motor for performing a read and write operation from and on CD 13.

At this time, spindle motor 9 for rotating turnable 6a having CD 13 thereon is driven by a Constant Linear Velocity (CLV) system.

Here, pickup 10 including optical head 11 is spaced apart from the surface of CD 13 by a predetermined distance (approximately 2 mm) different from the magnetic head employed for the foregoing FDD.

SUMMARY OF THE INVENTION

It is an object of the present invention to provide a compact disc and floppy disc compatible driver for driving a floppy disc and a compact disc in a same driver by improving a structure to minimize an installation area thereof, thereby tightly compacting a notebook computer.

To achieve the above object of the present invention, there is provided a compact disc and floppy disc compatible driver and a driving method, in which a first guide rail is installed to an inner center of one side, and a magnetic head is fitted to the first guide rail to perform a reciprocating motion. A stepping motor is fixed to one side of the magnetic head while being connected to the magnetic head for driving the magnetic head along the first guide rail, and a turnable of double loading system having different steps is rotatably attached to an upper portion of a lower side. Also, a spindle motor is rotatably coupled to a lower plane of the turnable, and a detecting unit is installed to an inner rear portion of a tray for inserting a floppy disc or compact disc therein. In addition, two second guide rails spacing from each other by a predetermined distance are diagonally installed in an inner central portion, a pickup storing an optical head therein is movably coupled to the second guide mils while running across the second guide rails, and a sled motor is fixed while being connected to the optical head for driving the optical head in the radius direction of the compact disc. Furthermore, two-step loading mechanism is provided for complement the difference between seating planes of the compact disc and floppy disc, and an elastic member in a loading member is installed for evading an imperfect loading resulting from the different thickness of a caddy and a diskette.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Hereinafter, a structure of a CD and FD compatible driver and driving method according to one embodiment of the present invention will be described with reference to FIGS. 4 to 10.

A deck employed to the CD and FD compatible driver according to the present invention is identical to that of the general 3.5" FDD in size and shape, and a pickup transfer system is provided together with a magnetic head transfer system to incorporate two functions of a CD driver and a FDD within a single driver.

Here, the typical 3.5" FD is put in a diskette and the 80 mm CD is put in a caddy to be utilized.

Figure 4:
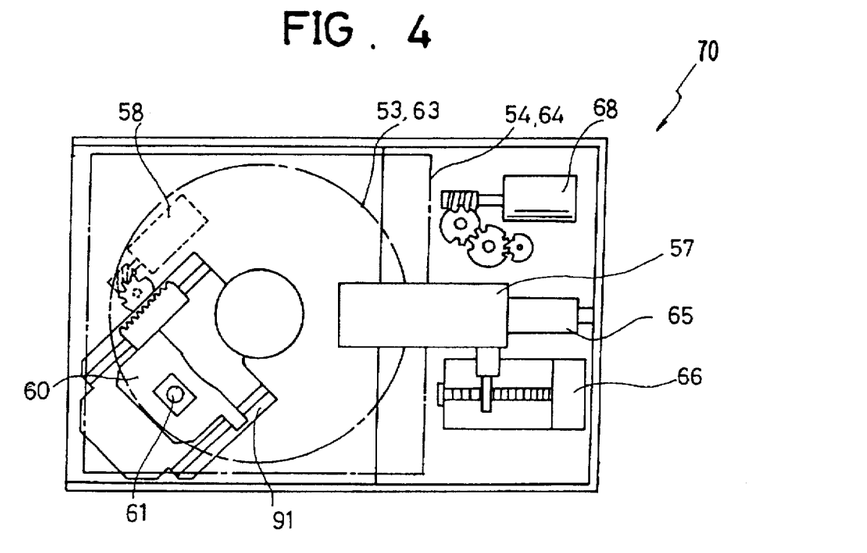
FIG. 4 is a plan view showing a driver according to one embodiment of the present invention.
Figure 5:
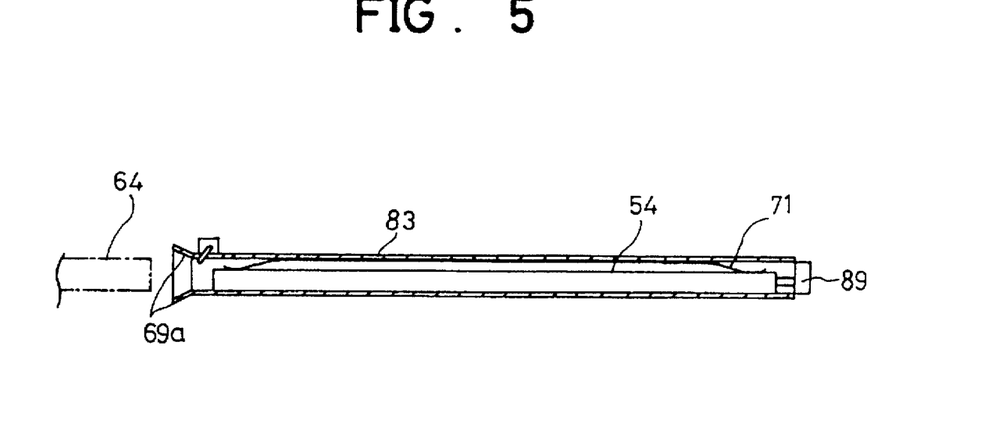
FIG. 5 is a vertical section view showing the tray in the loading member of the driver according to one embodiment of the present invention.

As shown in FIGS. 4 and 5, a first guide rail 65 is installed in the inner center of one side of a main body of a driver 70 according to the present invention. A magnetic head 57 is fitted into first guide rail 65 to perform a reciprocating motion. A stepping motor 66 for actuating magnetic head 57 along guide rail 65 is fixedly installed to one side of driver 70 while being coupled to magnetic head 57.

As illustrated in FIGS. 7A, 7B, 9A and 9B, a double-step turnable 56 having seating planes differing in accordance with modes (i.e., a FD mode and a CD mode) is rotatably attached to the upper portion down from the lower plane of driver 70. A spindle motor 67 joined to the lower plane of turntable 56 is rotatably attached to the lower portion down from the lower plane of driver 70.

A plurality of pressurizable check rods 88 for checking the state and volume of a FD 53 are installed to both inner sides toward the entrance of driver 70, which is the same as the general FDD.

Figure 7A:
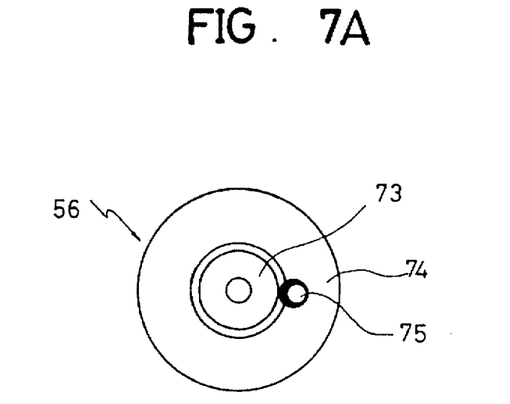
FIG. 7A is a front view showing the turntable according to one embodiment of the present invention.
Figure 7B:
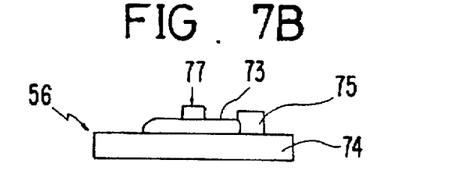
FIG. 7B is a plan view showing the turntable according to one embodiment of the present invention.

As shown in FIGS. 7A and 7B, a first seating plane 73 for seating FD 53 thereon is provided to the upper side of turntable 56, and a second seating plane 74 below first seating plane 73 for seating CD 63 thereof is integrally formed with first seating plane 73 in a body.

A pin 75 for being fitted into an insertion aperture (not shown) in the steel plate of FD 53 upwardly projects from the upper side of second seating plane 74 while being elastically supported by a spring 76.

Thus, the rotating of FD 53 is executed by fitting pin 75 into the insertion aperture in FD 53, the centering is by a pin and the clamping is by a magnet attached to the motor.

The aforesaid structure of clamping the FD is the same as the general one.

On the other hand, as shown in FIG. 4, two second guide rails 91 spaced apart from each other by a predetermined distance are diagonally installed in the inner center of driver 70. A pickup 60 storing an optical head 61 therein is connected to second guide rails 91 as running across second guide rails 91.

A sled motor 58 connected to optical head 61 for driving optical head 61 in the radius direction of CD 63 is fixed to one side of driver 70.

Here, pickup 60 including optical head 61 is spaced from the surface of CD 63 by a predetermined distance (approximately 2 mm).

Meantime, a loading motor 68 for loading a disc 53 or 63 inserted into driver 70 is provided to a predetermined inner portion of driver 70.

FIG. 5 is a vertical section view showing a tray in the loading member of driver 70 according to the present invention, in which an outwardly-bent abutment 69a is formed on the entrance side of tray 83 for receiving diskette 54 holding FD 53 or caddy 64 holding CD 63.

A switch 89 for checking whether caddy 64 is inserted or not is installed on the rear portion of tray 83, and an elastic member such as a plate spring 71 is installed on a predetermined upper portion of the interior of tray 83 to evade an imperfect loading due to the difference in the thickness of caddy 64 and diskette 54.

Consequently, inserted diskette 54 or caddy 64 can be elastically supported to permit diskette 54 or caddy 64 to closely contact the lower surface of driver 70, so that diskette 54 or caddy 64 can be firmly provided free from the thickness.

In the driver 70 according to the present invention, the plate spring 71 is employed as the elastic member, but another spring having the similar function may be used.

Figure 6A:
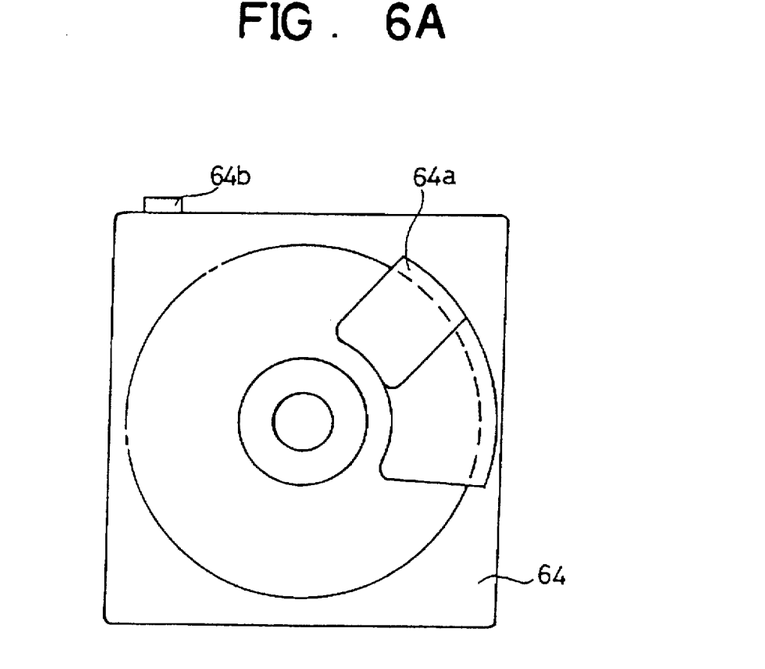
FIG. 6A is a plan view showing a structure of the caddy according to one embodiment of the present invention.
Figure 6B:
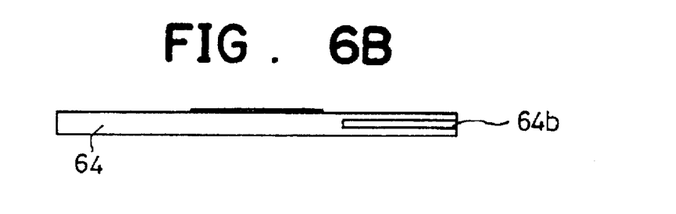
FIG. 6B is a vertical section view showing the structure of the caddy according to one embodiment of the present invention.

FIG. 6 is a detailed view showing caddy 64. Since pickup 60 is installed within driver 70 in the diagonal direction, a window panel 64a is also diagonally formed to caddy 64 to be able to open CD 63. A member 64b is projectingly installed to the side of caddy 64 to open window panel 64a when caddy 64 is inserted into driver 70.

The operation and effect of CD and FD compatible driver and driving method thereof according to one embodiment of the present invention will be described with reference to FIGS. 8 to 11 for each way of usage.

A case of using as the FDD will be described first.

Figure 11:
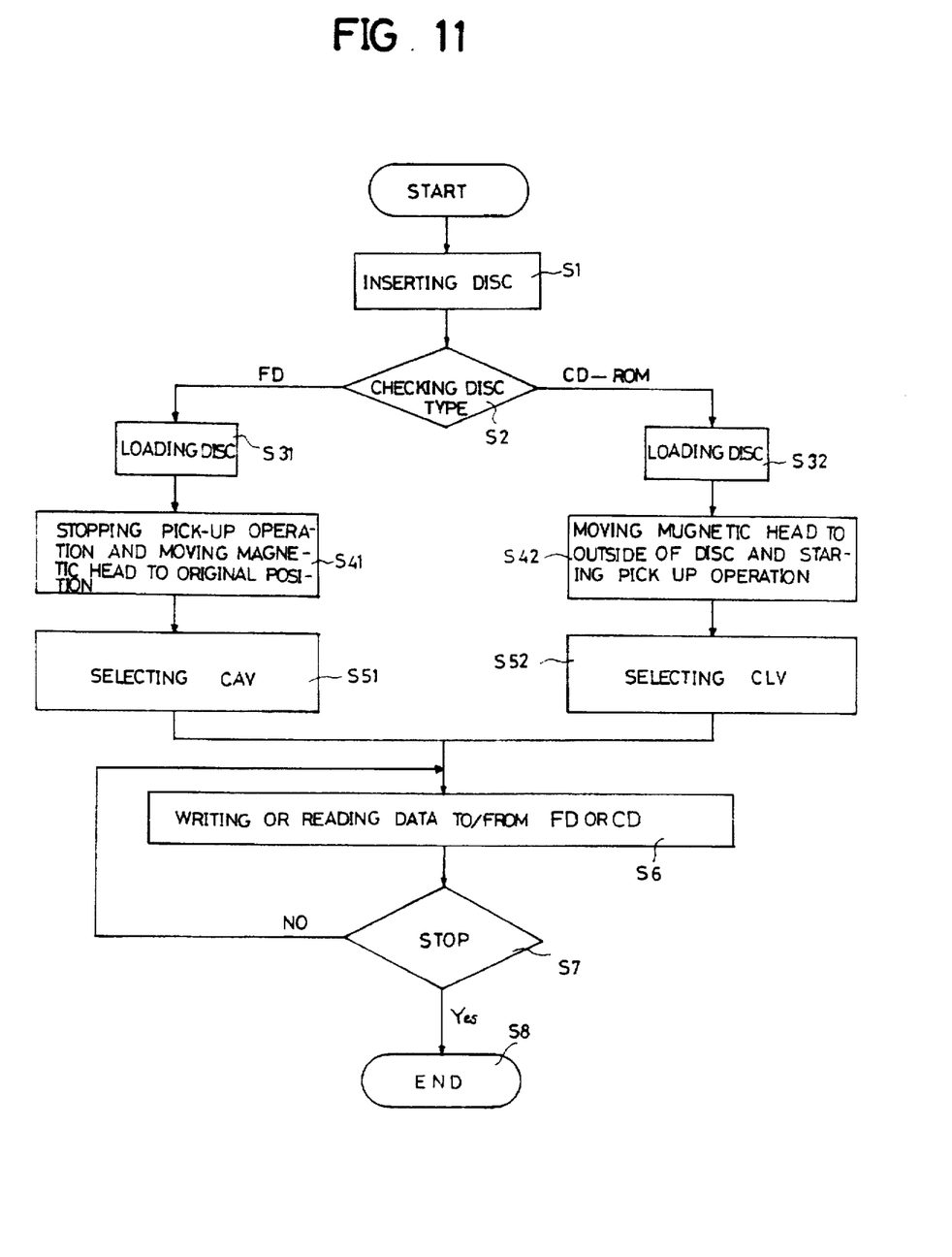
FIG. 11 is a flow chart showing a method of driving the driver according to one embodiment of the present invention.

Once FD 53 is inserted to tray 83 of FIG. 5, switch 89 is not turned on to allow a microcomputer (not shown) to recognize it as a FD drive mode (steps S1,S2).

Figure 8A:
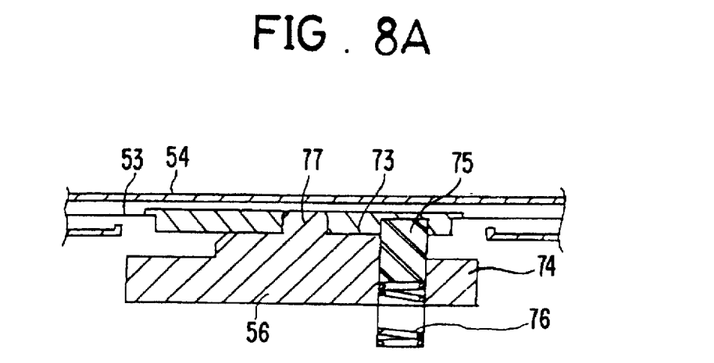
FIG. 8A is a vertical section view showing a state that the FD is seated on the turntable according to one embodiment of the present invention.

Then, the loading motor is driven to down tray 83 by one step, so that the steel plate of FD 53 is centered via a shaft 77 as shown in FIG. 8A to be seated onto first seating plane 73.

Here, the above-mentioned one step denotes that a stroke is adjusted to seat FD on the first seating plane 73, thereby making tray 83 down.

At this time, pin 75 maintains the downwardly pressed state, and is fitted into the insertion aperture in the steel plate of FD 53 upon the rotation of spindle motor 67. Therefore, FD 53 is rotated altogether.

Under this state, magnetic head 57 reciprocates along the radius direction of FD to attain the read and write operation from and on the FD 53.

At this time, since optical head 61 of pickup 60 is designed to be spaced apart from the CD 63 by the predetermined distance of approximately 2mm even when the CD 63 is inserted, optical head 61 does not contact FD 53 after the FD 53 is seated on the turntable 56 (steps S31, S32).

In a controlling part, a microcomputer selects the CAV system as the rotation system of spindle motor 67 (step S51). For finishing the operation, an eject switch is pressed to drive the loading motor, so that tray 83 is upwardly raised to eject diskette 54 (steps S6 and S7, S8).

On the other hand, when using the driver according to the present invention as the CD driver, CD 63 is put in caddy 64 to be inserted into tray 83 (step S2, S32). Then, switch 89 is pressed by projecting member 64b of caddy 64 to be turned on and the microcomputer recognizes it as a CD drive mode.

After recognizing the inserted object as the CD as stated above, stepping motor is driven to allow magnetic head 57 having been moved toward the inner center of driver 70 by a predetermined distance to return to the original place at one inner side of driver 70 (step S42).

The reason of movinghead 57 f head 57 out of CD 63 is for inhibiting magnetic head 57 from contacting CD 63 to scratch the surface of CD 63.

Figure 8B:
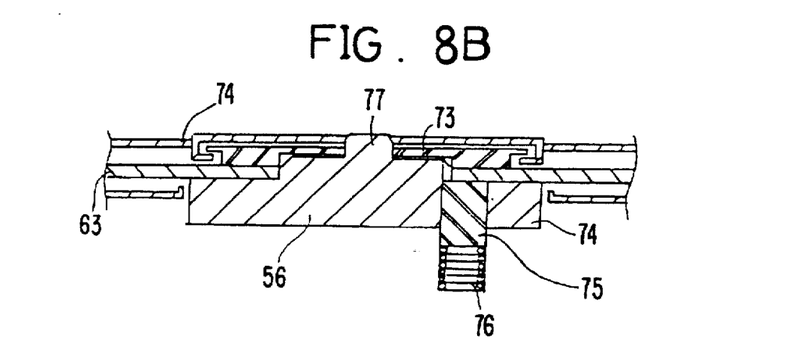
FIG. 8B is a vertical section view showing a state that the CD is seated on the turntable according to one embodiment of the present invention.
Figure 9A:
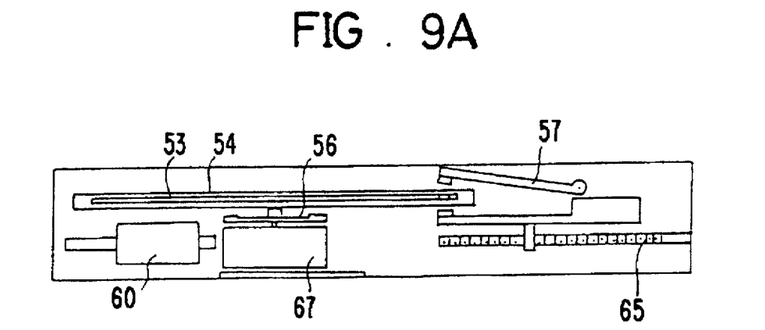
FIG. 9A shows a state that the FD is inserted into the driver according to one embodiment of the present invention.
Figure 9B:
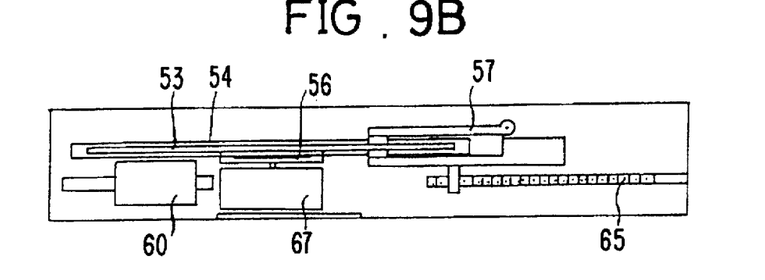
FIG. 9B shows a state that the FD is completely loaded onto the driver according to one embodiment of the present invention.

When magnetic head 57 is completely moved, the loading motor is driven to down tray 83 by two step. Thus, caddy 64 is seated on second seating plane 74 and clamped by a magnet attached to caddy 64 while centering by the side of first seating plane 73 as shown in FIG. 8B.

At this time, two step denotes a stroke adjusted to make the disc down to second seating plane 74, which differs from the stroke of the one step.

At this time, the pin 75 elastically supported by spring 76 to project from second seating plane 74 becomes embedded into turntable 56 while contacting the lower side of CD 63 by the clamping force of the magnet, so that the seating of CD 63 on the seating plane thereof is not impeded.

Figure 10A:
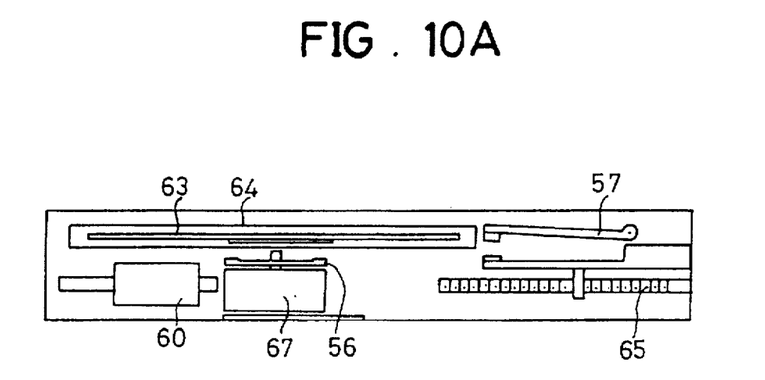
FIG. 10A shows a state that the CD is inserted into the driver according to one embodiment of the present invention.
Figure 10B:
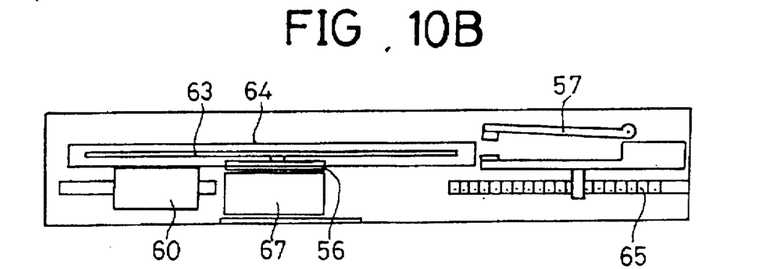
FIG. 10B shows a state that the CD is completely loaded onto the driver according to one embodiment of the present invention.

Once CD 63 is completely loaded as described above, sled motor 58 is driven to supply power to pickup 60 attached with optical head 61. Accordingly, optical head 61 reciprocates in the radius direction of CD 63 to perform the read and write operation from and on CD 63, as illustrated in FIGS. 10A and 10B.

At this time, the magnetic head portion withdrawn out of the CD conducts no operation.

When the inserted disc is CD 63, the microcomputer in the controlling part selects CLV system as the rotation system of spindle motor 67 (step S52).

For a finishing operation, the eject switch is pressed to drive the loading motor, so that tray 83 is upwardly raised to eject caddy 64 (step S6,57,58).

As described above, when the turntable is rotated in accordance with the selected rotation system per type of the inserted disc, the magnetic head or pickup reads and writes information from and on each disc while moving toward the center of respective discs.

As a result, in the compact disc and floppy disc compatible driver and driving method thereof according to the present invention as described above, only a single driver performs two driver functions of the FD and CD, which are similar in system of inserting/ejecting respective discs, reading out a signal by the rotation of the spindle motor and inputting it into a PC as a digital signal. Therefore, a notebook computer can be further minimized. Additionally, almost all components such as the spindle motor, loading mechanism and external architecture except the magnetic head and transfer system of the FDD and the optical head and transfer system of the pickup are commonly utilized to enable to employ elements of the FDD together with the CD, thereby economizing the cost.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A compact disc and floppy disc compatible driver comprising:

a first guide rail installed to an inner center of one side of a main body;

a magnetic head fitted to said first guide rail to perform a reciprocating motion;

a stepping motor fixed to one side of said magnetic head while being connected to said magnetic head for driving said magnetic head along said first guide rail;

a turnable having different steps rotatably attached to an upper portion of a lower side;

a spindle motor rotatably coupled to a lower plane of said turntable;

detecting means installed to an inner rear portion of a tray for inserting a floppy disc or compact disc therein;

two second guide rails spacing from each other by a predetermined distance diagonally installed in an inner central portion;

a pickup storing an optical head therein and movably coupled to said second guide rails while running across said second guide rails;

a sled motor fixed while being connected to said optical head for driving said optical head in the radius direction of said compact disc; and an elastic member installed to a predetermined portion of an inner upper plane of said troy for evading an imperfect loading resulting from the different thickness of a caddy and a diskette.

2. A compact disc and floppy disc compatible driver as claimed in claim 1, wherein said turnable is provided with a first seating plane for seating said floppy disc thereon and a second seating plane below said first seating plane for seating said compact disc thereon which is integrally formed with said first seating plane.

\* \* \* \* \*